United States Patent
Kotler et al.

(10) Patent No.: US 11,586,894 B2
(45) Date of Patent: Feb. 21, 2023

(54) ORDERING COMPUTATIONS OF A MACHINE LEARNING NETWORK IN A MACHINE LEARNING ACCELERATOR FOR EFFICIENT MEMORY USAGE

(71) Applicant: SiMa Technologies, Inc., San Jose, CA (US)

(72) Inventors: Reed Kotler, San Jose, CA (US); Nishit Shah, Sunnyvale, CA (US)

(73) Assignee: SiMa Technologies, Inc., San Jose, CA (US)

( * ) Notice: Subject to any disclaimer, the term of this patent is extended or adjusted under 35 U.S.C. 154(b) by 271 days.

(21) Appl. No.: 16/866,513

(22) Filed: May 4, 2020

(65) Prior Publication Data

US 2021/0342675 A1 Nov. 4, 2021

(51) Int. Cl.
*G06N 3/04* (2006.01)
*G06N 3/063* (2023.01)
*G06N 3/08* (2023.01)

(52) U.S. Cl.
CPC .............. *G06N 3/063* (2013.01); *G06N 3/04* (2013.01); *G06N 3/08* (2013.01)

(58) Field of Classification Search
CPC ............. G06N 3/04; G06N 3/063; G06N 3/08
See application file for complete search history.

(56) References Cited

U.S. PATENT DOCUMENTS

| 9,928,460 B1 | 3/2018 | Nowatzyk et al. |
| 2001/0029520 A1 | 10/2001 | Miyazaki et al. |
| 2016/0379686 A1 | 12/2016 | Burger et al. |
| 2017/0103299 A1 | 4/2017 | Aydonat et al. |
| 2017/0178386 A1 | 6/2017 | Redshaw et al. |
| 2019/0004878 A1 | 1/2019 | Adler et al. |
| 2019/0018815 A1 | 1/2019 | Fleming et al. |
| 2019/0076031 A1 | 3/2019 | Valys et al. |

(Continued)

OTHER PUBLICATIONS

International Search Report and Written Opinion, PCT Patent Application No. PCT/US2021/027998, dated Aug. 25, 2021, 22 pages.

(Continued)

*Primary Examiner* — Sam Bhattacharya
(74) *Attorney, Agent, or Firm* — Fenwick & West LLP

(57) ABSTRACT

A compiler efficiently manages memory usage in the machine learning accelerator by intelligently ordering computations of a machine learning network. The compiler identifies a set of partial networks of the machine learning network representing portions of the machine learning network across multiple layers on which an output or set of outputs are dependent. Because any given output may depend on only a limited subset of intermediate outputs from the prior layers, each partial network may include only a small fraction of the intermediate outputs from each layer. Instead of implementing the MLN by computing one layer at a time, the compiler schedules instructions to sequentially implement partial networks. As each layer of a partial network is completed, the intermediate outputs can be released from memory. The described technique enables intermediate outputs to be directly streamed between processing elements of the machine learning accelerator without requiring large transfers to and from external memory.

23 Claims, 11 Drawing Sheets

(56) References Cited

U.S. PATENT DOCUMENTS

| | | | |
|---|---|---|---|
| 2019/0155768 A1 | 5/2019 | Wilkinson et al. | |
| 2019/0205737 A1 | 7/2019 | Bleiweiss et al. | |
| 2019/0286973 A1 | 9/2019 | Kovvuri et al. | |
| 2019/0303346 A1 | 10/2019 | Brewer | |
| 2019/0391796 A1 | 12/2019 | Brady et al. | |
| 2020/0007342 A1 | 1/2020 | Liem et al. | |
| 2020/0012536 A1 | 1/2020 | Lacey et al. | |
| 2020/0012537 A1 | 1/2020 | Lacey et al. | |
| 2020/0073830 A1 | 3/2020 | Verrilli et al. | |
| 2020/0090383 A1 | 3/2020 | Dwivedi | |
| 2020/0133914 A1 | 4/2020 | Wilkinson et al. | |
| 2020/0150713 A1 | 5/2020 | Knowles et al. | |
| 2020/0320403 A1 | 10/2020 | Daga et al. | |
| 2021/0174137 A1 | 6/2021 | Kim et al. | |
| 2021/0201526 A1 | 7/2021 | Moloney et al. | |
| 2021/0278810 A1* | 9/2021 | Heesche | G06N 3/04 |
| 2022/0044153 A1 | 2/2022 | Madar et al. | |

OTHER PUBLICATIONS

Andri et al., "YodaNN: An Architecture for Ultralow Power Binary-Weight CNN Acceleration", IEEE Transactions on Computer-Aided Design of Integrated Circuits and Systems, vol. 37, No. 1, Jan. 2018, pp. 48-60.

Ankit et al., "PUMA: A Programmable Ultra-efficient Memristor-based Accelerator for Machine Learning Inference", ASPLOS'19, Apr. 13-17, 2019, Providence, RI, USA, pp. 715-731.

Du et al., "ShiDianNao: Shifting Vision Processing Closer to the Sensor", ISCA'15, Jun. 13-17, 2015, Portland, OR, USA, pp. 92-104.

Everson et al., "A 104.8TOPS/W One-Shot Time-Based Neuromorphic Chip Employing Dynamic Threshold Error Correction in 65nm", IEEE Asian Solid-State Circuits Conference Nov. 5-7, 2018/Tainan, Taiwan, pp. 273-276.

Guha, A. et al., "Deepframe: A Profile-Driven Compiler for Spatial Hardware Accelerators," 2019 28th International Conference on Parallel Architectures and Compilation Techniques (PACT), Sep. 23-26, 2019, pp. 68-81.

Jiao et al., "A 12nm Programmable Convolution-Efficient Neural-Processing-Unit Chip Achieving 825TOPS", ISSCC 2020, Session 7, Feb. 18, 2020, 5 pages.

Reuther et al., "Survey and Benchmarking of Machine Learning Accelerators", 2019 IEEE High Performance Extreme Computing Conference (HPEC) Sep. 24-26, 2019, pp. 1-9.

Shawahna et al., "FPGA-Based Accelerators of Deep Learning Networks for Learning and Classification: A Review", IEEE Access, vol. 7, 2019, pp. 7823-7858.

United States Office Action, U.S. Appl. No. 16/865,226, dated Jul. 14, 2022, 12 pages.

United States Office Action, U.S. Appl. No. 16/862,515, dated Aug. 17, 2022, 30 pages.

* cited by examiner

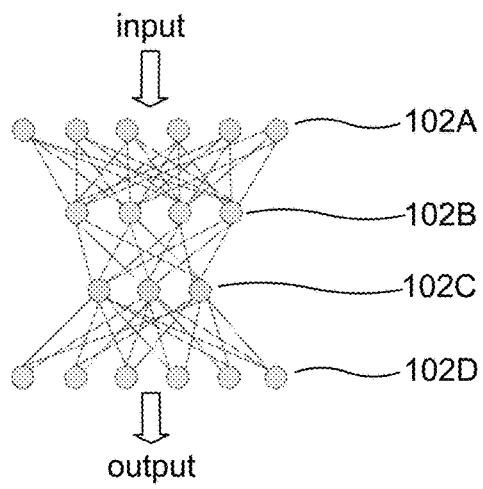
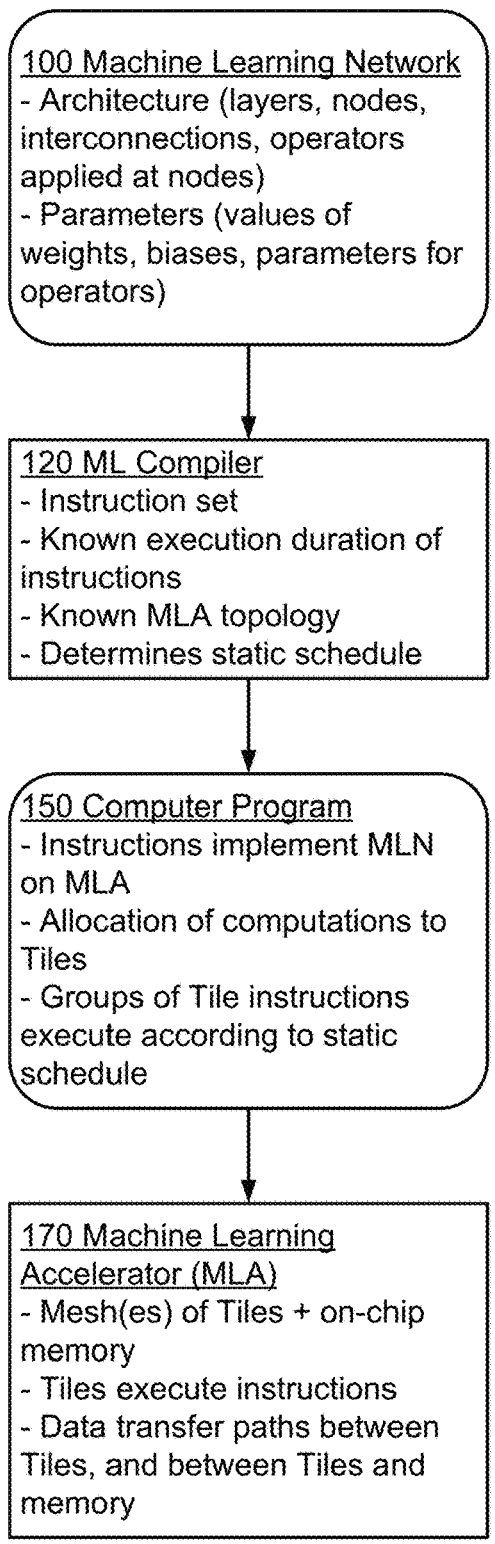
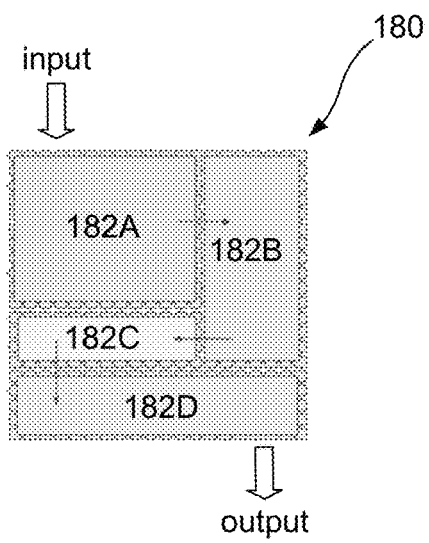
FIG. 1A

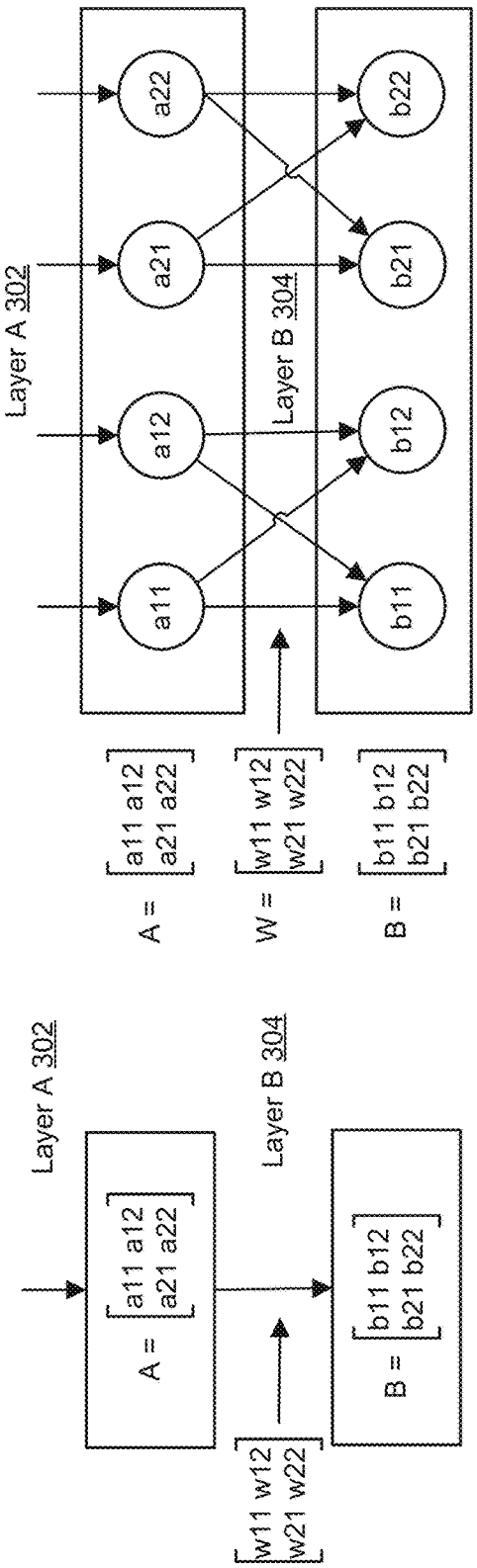
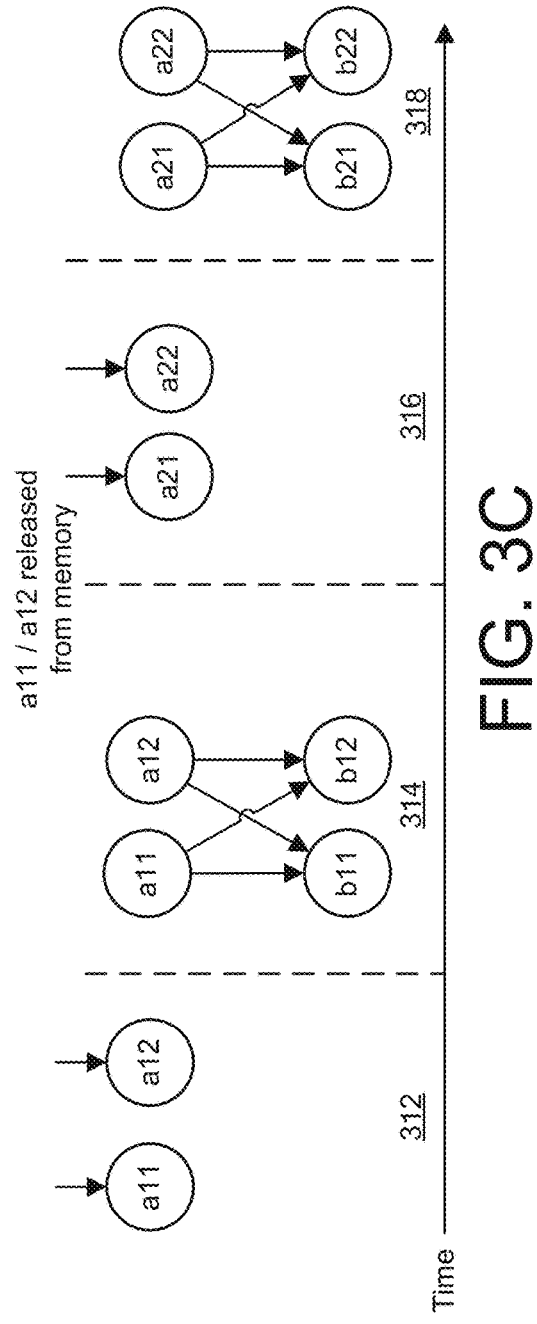

ORDERING COMPUTATIONS OF A MACHINE LEARNING NETWORK IN A MACHINE LEARNING ACCELERATOR FOR EFFICIENT MEMORY USAGE

BACKGROUND

1. Technical Field

This disclosure relates, in general, to the implementation of machine learning networks on hardware.

2. Description of Related Art

Machine learning is one of the most powerful recent trends in technology. In machine learning, a model is developed to perform a certain task. The model, which will be referred to as a machine learning network, is trained and deployed in order to carry out that task. For example, a model may be developed to recognize the presence of objects within images captured by a set of cameras. Once the model is deployed, images captured by the cameras are input to the machine learning network, which then outputs whether (or to what confidence level) objects are present within the images.

Machine learning networks typically require the handling of a large volume of data and the execution of a large number of computations. As a result, they are commonly implemented in compute facilities with access to significant resources, such as in the cloud or on server clusters. However, the sources of input to machine learning networks may be located remotely from these compute facilities. For example, cameras and other types of sensors may be located on the edge of the network. Example applications for edge devices include automotive and other forms of transportation including autonomous transportation, agricultural, industrial, robotics, drones, surveillance and security, smart environments including smart cities, medical, and personalized health. Example tasks include computer vision, image analysis, image understanding, speech recognition, audio analysis, audio understanding, natural language processing, classification and pattern recognition tasks. For edge devices, it may be desirable to perform certain tasks in real-time. In addition to memory and other programmable processors, an edge device may also include sensors, such as cameras (both still image and video cameras), microphones, temperature sensors, pressure sensors and other types of sensors. The sensors may capture samples that are used as inputs to a computing pipeline within the edge device. Thus, one common paradigm is for the input sources to be web-based so that they can continuously send their captured data to the cloud-based compute facility, which then executes the machine learning network and returns the result.

However, there can be many advantages if the machine learning network and computing elements on which it executes was instead embedded on edge devices, such as combined with the camera system.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIG. 1A is a block diagram of a system with a machine learning accelerator (MLA) and corresponding compiler, according to the invention.

FIG. 3A-3C illustrate a first example of a technique for ordering computations in implementing a machine learning network.

DETAILED DESCRIPTION OF THE PREFERRED EMBODIMENTS

Figure 1B:
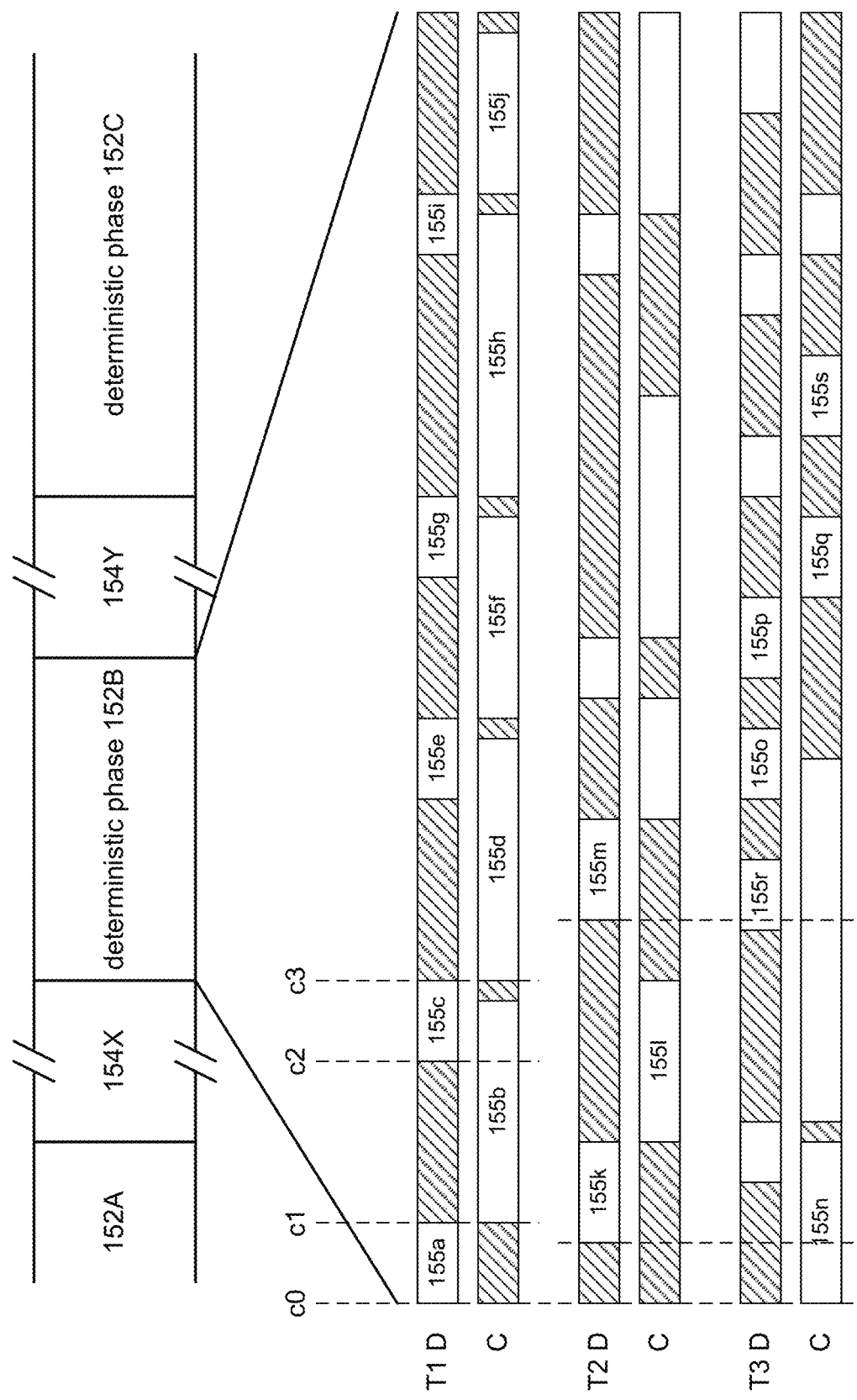
FIG. 1B illustrates partitioning a computer program into deterministic and non-deterministic phases.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

A machine learning network comprises a sequence of layers that each receive a data set from the previous layer, apply some function to the data, and output a data set to a subsequent layer. The outputs of each layer may involve millions or billions of data points, making memory management a challenging task, particularly when implementing the machine learning network on a semiconductor die with limited memory capacity and reduced power consumption. For speed, power and memory efficiency, it is beneficial to minimize the amount of temporary data that needs to be stored at any given time and to reduce the number of data transfers, particularly data transfers to more remote memories. This can be achieved in a machine learning accelerator (MLA) in which instructions implementing the computations are intelligently ordered to limit memory usage and data transfers.

Example embodiments of a general MLA system and corresponding compiler that operates to implement an MLN in a manner that achieves limited memory usage by intelligent ordering of the computations are described below with respect to FIGS. 1-2. The general MLA system is one example of such an architecture that can benefit from the techniques described herein. In alternative embodiments, the techniques described herein for ordering the computations of an MLN can be applied in MLA systems having different architectures and operational structures.

FIG. 1A is a block diagram of one example of a system with a machine learning accelerator (MLA) 170 and corresponding compiler 120, according to the invention. The compiler 120 receives a description of a machine learning network 100 and generates a computer program 150 that implements the machine learning network using MLA 170. The computer program 150 includes instructions that are executed by processing elements (Tiles) in the MLA according to a schedule determined by the compiler. For convenience, these will be referred to as statically scheduled instructions. The instructions executed by the Tiles (Tile instructions) are statically scheduled because the compiler can determine which instructions are executed by which Tiles at what times, as will be explained in greater detail below. For example, for the statically scheduled instructions, there are no conditions, branching or data dependencies that can be resolved only at run-time, and which would affect the timing and order of the execution of the instructions. Note that the static schedule determined by the compiler may or may not be included as part of the instructions and computer program. In some embodiments, the computer program may expressly include the schedule, specifying that instruction A is executed at cycle X, instruction B is executed at cycle X+4, instruction C is executed at cycle X+12, etc. In alternate embodiments, the computer program may specify only that instruction A is executed, followed by instruction B, and then instruction C, but without any scheduling information. Even though the static schedule is not expressly specified, these instructions will still execute according to the schedule determined by the compiler because the compiler knows how long it takes to execute each instruction. As a result of the static scheduling, the MLA and instruction set for the MLA may be simplified, with the complexity offloaded to the compiler. A simpler MLA can result in lower cost, lower power consumption and higher performance, all of which are desirable for implementation in edge devices.

In more detail, the MLN 100 may be described by an architecture and parameters. A depiction of an MLN is shown to the right of box 100 in FIG. 1A. Most MLNs include multiple layers 102, each with one or more nodes which are represented by circles in FIG. 1A. The lines between nodes in FIG. 1A represent interconnections between the nodes (and layers). Each node calculates a weighted sum of the values received from its connected nodes, possibly also applying a bias. Examples are matrix multiplication and convolution. Each node may also apply certain functionality (operators), such as nonlinear functions (e.g., tanh function), softmax operator, etc. A typical node may compute an output:

$$y = F(\Sigma w_i x_i + b) \quad (1)$$

where $x_i$ are the inputs received from other nodes i, $w_i$ are weights, b is a bias and F( ) is a nonlinear operator. The MLN architecture includes the number of nodes (and layers) and their interconnectivity, and the operators applied at nodes. The operators may be described in a parameterized form. The MLN parameters include the weights, biases, and parameters for the operators.

MLNs may vary in size, depending on the desired task. Small MLNs may have 5-10 or fewer layers, medium size MLNs may have 30-50 layers, and large MLNs may have 100 or more layers. Examples of inputs include text, images and video. Some of the layers may be fully interconnected (i.e., every node in one layer provides input to every node in the next layer) or very densely interconnected, and others may be more locally or sparsely interconnected (e.g., to implement convolutions). Each weighted interconnect represents a scalar multiplication. The total number of scalar multiplications required to implement an MLN may be on the order of millions, billions, tens of billions or even more. These may be carried out by matrix multiplications.

The MLA 170 includes a plurality of Tiles 180 and an on-chip memory system implemented on a semiconductor die. The Tiles are organized into one or more meshes of interconnected Tiles. A depiction of a Tile mesh is shown to the right of box 170 in FIG. 1A. In each mesh, the Tiles 180 are organized in a regular pattern and the interconnections within each mesh provide data transfer paths between Tiles in the mesh. The Tiles execute computations according to instructions received by the Tiles and using data stored in the on-chip memory system. These instructions may be for computations and/or for data transfer. Computations include multiply (including matrix multiply), add, and operators (e.g., nonlinear functions, lookup table, min/max, pooling). These are computations that implement the MLN. In the example of FIG. 1A, the computations performed by layers 102A-D are allocated to groups 182A-D of Tiles as indicated. The allocation is not required to be 1:1. For example, multiple layers could be allocated to a single Tile or vice versa. Not every computation required to implement an MLN need be executed by a Tile; some computation may be executed outside the MLA (e.g., floating point operations, if the Tiles only do integer arithmetic). Tiles typically will at least perform matrix multiplication.

The compiler 120 receives a description of the MLN 100 and generates a computer program 150 that implements the MLN using the MLA 170. The computer program 150 receives an input sample for the MLN and executes the operations of the MLN to produce the output for the MLN. The computer program 150 includes instructions to be executed by the Tiles for implementing computations in the MLN and may also include instructions to be executed by other elements, such as a controller outside the Tiles.

The compiler 120 determines the allocation of computations to Tiles and the order of the computations in part to reduce data transfers. For example, the Tiles typically have limited local memory. If the compiler 120 can schedule the computations so that the number of intermediate values at any point in time is low enough to be stored entirely or predominately within local memory, then data transfers to memories outside the Tiles may be avoided or significantly reduced. Furthermore, even if the compiler schedules data transfers to external memories outside the Tiles, the compiler 120 can still determine the order of computations in a way that reduces the amount of data being stored, thereby making efficient use of available memory resources. For example, in FIG. 1A, if the number of nodes in the layers 182 is large, then computing all of the outputs for a layer at once may result in too many values to store in local memory. The entire layer's output may have to be transferred to an external memory instead. To avoid this, the compiler may schedule the calculations so that the outputs are computed as they are needed by the next layer. When those outputs are consumed by the next layer, they need no longer be stored. The total number of outputs required at any point in time may be drastically reduced and stored entirely or at least partially in local memory, eliminating or reducing the need for data transfers to external memory.

As shown in FIG. 1B, the compiler partitions the Tile instructions into one or more deterministic phases 152A,B,C which typically utilize multiple Tiles. The instructions in a deterministic phase 152 may be statically scheduled by the compiler. For example, a deterministic phase 152 may include a series of computations required to implement a portion of the MLN, where the time required for each computation and associated data transfers is known. As a result, the compiler may statically schedule the Tile instructions within that deterministic phase relative to the other Tile instructions in the phase. The resulting computer program produced by the compiler then implements an allocation of instructions to Tiles and a schedule for executing the instructions as determined by the compiler, although these may not be expressly contained within the computer program. In the example of FIG. 1A, the computations performed by layers 102A-D are allocated to groups 182A-D of Tiles as indicated. In addition, all of the Tile instructions (including both for computation and for data transfer) are executed in a single deterministic phase.

The computer program may also include non-deterministic phases 154X,Y. For example, non-deterministic phases 154 may include data fetch or instruction fetch from off-chip memory where the time required to execute the operation varies too much to allow reliable synchronization with other operations. Other examples include computations that occur off-chip, and conditions, branching and other programmatic constructs that depend on values not known until run-time. The breaks in the rectangles for the non-deterministic phases 154 indicate that the timing is not deterministic, whereas the deterministic phases 152 are represented by rectangles without breaks. In FIG. 1B, the deterministic and non-deterministic phases are shown as alternating. This is not required. For example, deterministic and non-deterministic phases may execute concurrently.

FIG. 1B also shows more detail of deterministic phase 152B, which shows the static schedule computed by the compiler for executing Tile instructions in this phase. The phase 152B begins at some time when all of the Tiles are synchronized, which for convenience is marked as cycle c0 in FIG. 1B. The Tiles may have circuitry that synchronizes the Tiles. For example, each Tile may monitor when it is ready to begin execution of a deterministic phase 152B and then actual execution begins when all Tiles signal that they are ready. Alternatively, an external controller may synchronize the Tiles and start the deterministic phase 152B when all Tiles are ready.

In this example, the instructions are executed by three Tiles, as denoted by T1, T2 and T3. Each Tile has two pipelines: a "D" pipeline for executing data transfer instructions and a "C" pipeline for executing compute instructions. The row labeled T1 D shows instructions executed by the Tile 1 D (data transfer) pipeline, and the row labeled T1 C shows instructions executed by the Tile 1 C (compute) pipeline. For this example, assume that all the data transfer instructions are instructions that load new data into that Tile for consumption by the compute pipeline. The white regions of each row denote the execution of instructions and the hashed regions indicate that the pipeline is idling or executing a NO-OP (no operation).

For Tile 1, instruction 155a transfers data into Tile 1 and instruction 155b then performs a computation that consumes that data. Instruction 155b is dependent on instruction 155a. Here, the T1 C pipeline is not required to continuously poll the T1 D pipeline at run-time for when the data is available, and run-time message passing between the pipelines is not required to indicate that the data is available. Rather, because the duration (i.e., time required to execute) of instruction 155a is known, the compiler knows when the data will be available (for convenience, marked as cycle c1 in the figure) and can construct a static schedule in which instruction 155b starts execution then. The duration of instruction 155b is also known, so the compiler knows that compute instruction 155d may start after instruction 155b. In this case, the compiler determines a static schedule in which instruction 155d starts at cycle c3. Compute instruction 155d depends on data brought into the Tile by instruction 155c. The duration of instruction 155c is known, so the compiler knows that in the static schedule, instruction 155c must start at cycle c2 or earlier. This pattern is repeated for pairs of data transfer instructions and compute instructions 155e-f, 155g-h, 155i-j.

For Tile 2, compute instruction 155l depends on data from data transfer instruction 155k. However, instruction 155k does not start immediately at cycle c0. Rather, it has a delayed start at cycle c4. This may be because the data transfer path required by instruction 155k is occupied by some other data transfer instruction and is not available until cycle c4. The start time of instruction 155k in the static schedule is not determined by run-time arbitration or contention mechanisms for the shared data transfer path. Rather, the compiler knows that the data transfer path is occupied since the compiler knows the start times and durations of all the instructions, so the compiler simply creates a static schedule in which instruction 155k does not start until cycle c4 when the compiler knows the data transfer path will be available. Similarly, data transfer instruction 155m has a delayed start time. Perhaps the T2 D pipeline is being used to transfer out the results of computation 155l and does not become available until cycle c5.

For Tile 3, computation 155n starts immediately at cycle c0. Perhaps the required data was loaded into Tile 3 during some prior phase. Data transfer instructions 155o and 155p load data for compute instruction 155q. They are separated in time, perhaps because different pieces of data were not available or the data transfer paths were not available until those times. As a final example, data transfer instruction 155r loads data for compute instruction 155s. In the static schedule, the compiler places instruction 155r well in advance of when the data is required, but this may be because that is when the data transfer path is available or perhaps the data was transferred out of the sourcing Tile in order to make room in that Tile.

Execution of the instructions according to the static schedule at run-time may be implemented in different ways. In one approach, the computer program includes an express schedule for the execution of the instructions. Continuing the example of FIG. 1B, the computer program may specify that instruction 155a executes at cycle c0, instruction 155b at cycle c1, instruction 155c at cycle c2, etc. Alternatively, the compiler may fill each instruction stream with NO-OPs to achieve the correct timing. A NO-OP (no operation) is an instruction that occupies a certain number of cycles without other activity. For example, the compiler knows that instruction 155a will end at cycle c1 and instruction 155b is supposed to begin at cycle c1. It may fill the space between cycles c0 and c1 with NO-OPs for the T1 C pipeline. The T1 C pipeline then just continuously executes instructions from its queue, and the NO-OPs ensure that instruction 155b is executed according to the compiler's static schedule. In yet another approach, the static schedule may be implemented by hardware. The T1 C pipeline may just stall on the execution of instruction 155b until the data from instruction 155a is ready. The compiler knows that data will be ready at cycle c1 and, therefore, instruction 155b will execute starting at cycle c1 even though the Tiles are unaware of the static schedule. Regardless of the implementation, for convenience, all of these situations will be described using the phrase "static schedule." Thus, a statement that the compiler statically schedules the instructions is intended to include all of the above implementations and is not meant to imply that the computer program expressly includes a scheduled time for each instruction.

In order to statically schedule the instructions in a deterministic phase, the compiler typically will know the duration of each instruction (i.e., how long each instruction takes to execute), the capabilities of each Tile (which Tiles can execute which instructions), the topology of data transfer paths to and from Tiles (including between Tiles, and between Tiles and on-chip memory), and the computations required and their dependencies (i.e., the MLN description). With this information, the compiler can schedule unconditional start times for the Tile instructions. Here, unconditional refers to run-time conditions. The execution order of statically scheduled instructions will not change as a result of run-time conditions, branching or dependence on input values. As a result, compute instructions may be scheduled for start times when all of the required data for the computation is known to be available and the compute pipeline is also known to be available. The need for run-time determination of whether data has arrived and whether the compute pipeline is available may be avoided. Analogously, data transfer instructions may be scheduled for start times when the data transfer path is known to be available. The need for circuitry to handle arbitrations, or to check for or resolve contentions and collisions on shared data transfer paths at run-time may be avoided. The need for routing tables and other circuitry to determine routing at run-time may also be avoided.

The approach based on static scheduling described above is not restricted to the examples described above. For example, different network topologies of Tiles may be used. Other Tile meshes may also be statically scheduled, so long as the time required to execute computations and to transfer data between Tiles is deterministic and may be determined at compile time. Additional examples are described in U.S. application Ser. No. 16/840,216, "Machine Learning Network Implemented by Statically Scheduled Instructions, with Compiler," which is incorporated by reference herein in its entirety.

Other aspects include components, devices, systems, improvements, methods, processes, applications, computer readable mediums, and other technologies related to any of the above.

Figure 2A:
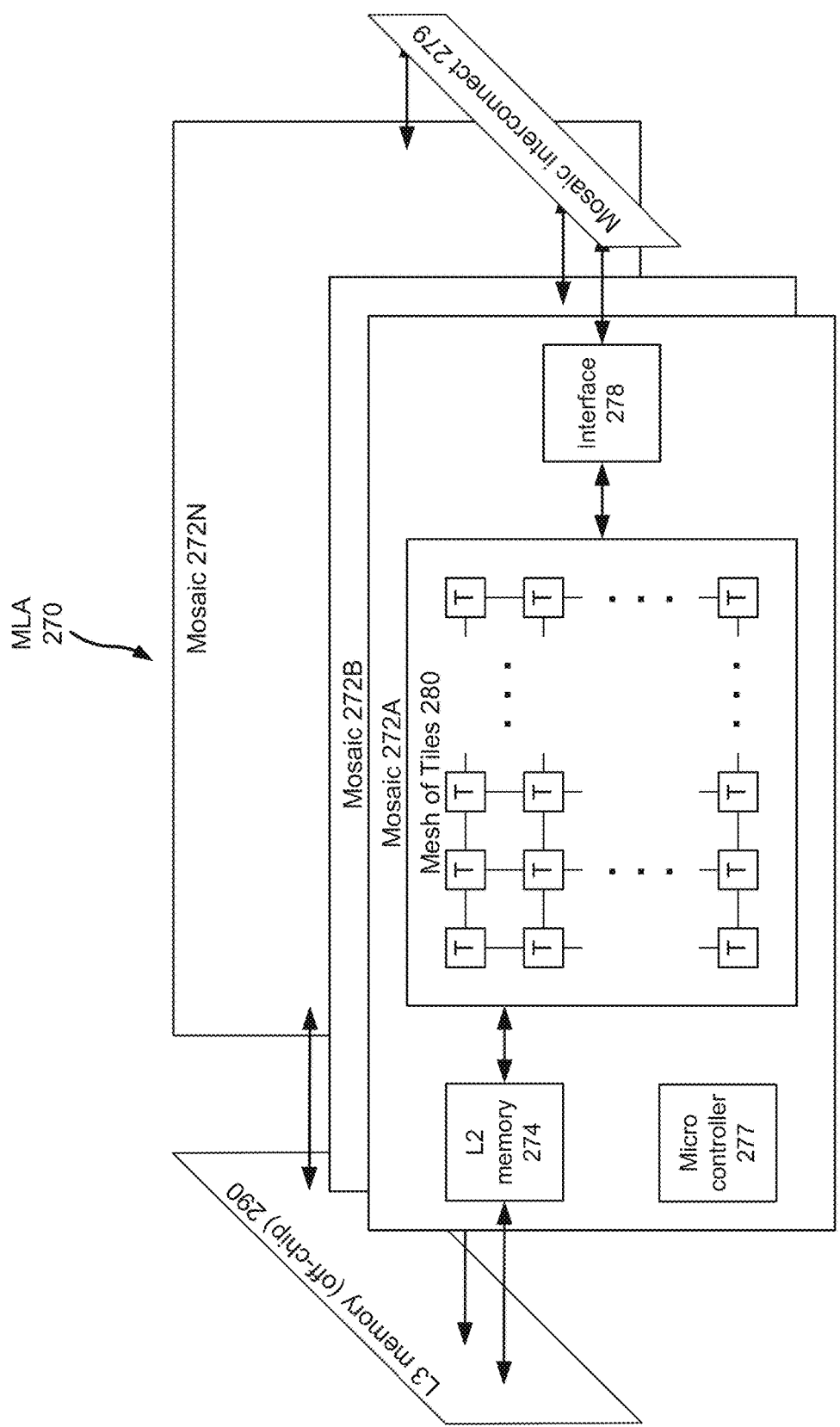
FIG. 2A is a block diagram of a hardware system, including an MLA.

FIG. 2A is a block diagram of a hardware system including an MLA 270. The MLA 270 includes all the components shown in FIG. 2A, except the off-chip L3 memory 290. The MLA components are implemented on a single die as part of a single chip. The MLA 270 includes one or more mosaics 272A-N. In this example, all of the mosaics are the same. Each mosaic 272 includes a mesh of Tiles 280, an on-chip memory system and a controller 277. In FIG. 2A, the on-chip memory system is a multi-level memory system, which includes a level 1 (L1) memory distributed among the Tiles (see FIG. 2B) and a level 2 (L2) memory 274 shared by the Tiles. If there are multiple mosaics 272, the MLA 270 may include a dedicated interconnect 279 for connecting the different mosaics. Each mosaic also includes an interface 278 to the interconnect 279.

Figure 2B:
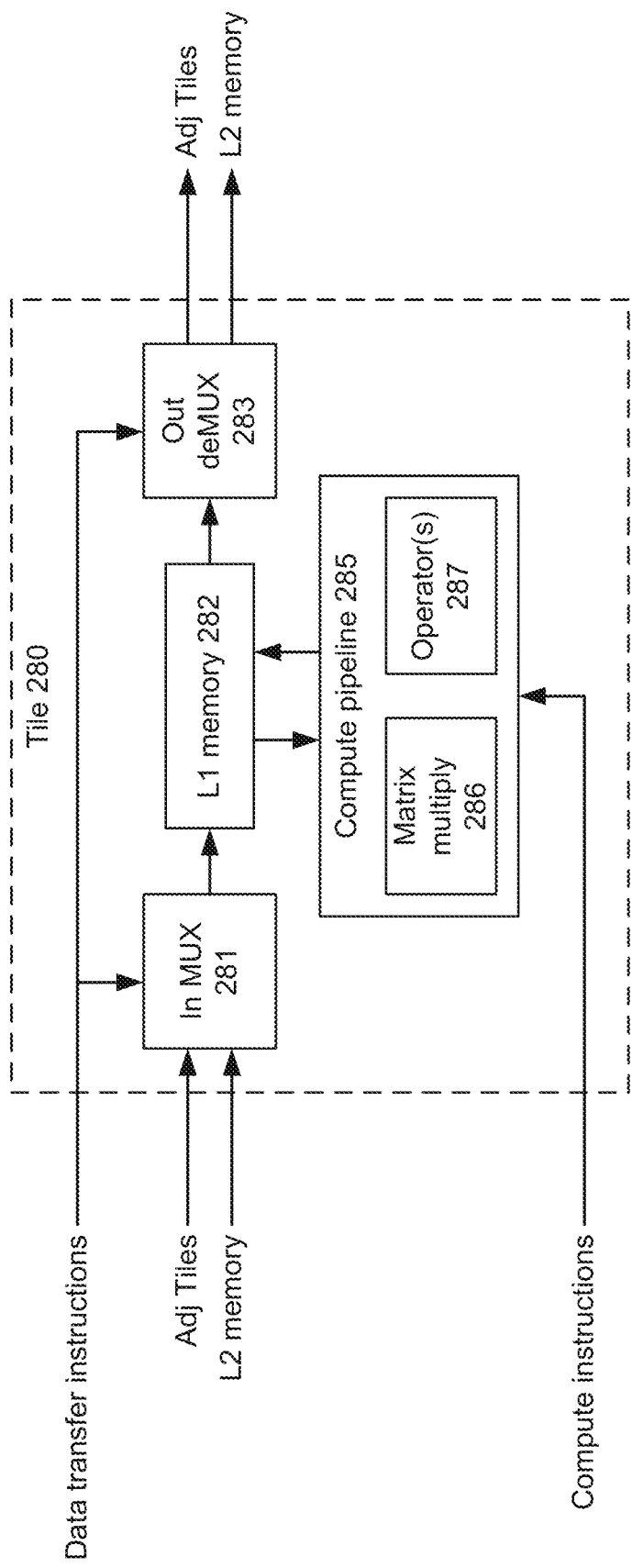
FIG. 2B is a block diagram of a Tile within an MLA.

FIG. 2B is a block diagram of a Tile 280 within the MLA. In this example, all the Tiles are the same. Each Tile 280 includes an L1 memory 282. Each Tile 280 also includes a data transfer pipeline that executes instructions for transferring data to and from the L1 memory 282. Here, the Tiles 280 are arranged in a rectangular array as shown in FIG. 2A, with each Tile connected to its adjacent neighbors. Interior Tiles are connected to four adjacent Tiles. Edge Tiles are connected to adjacent Tiles and also to L2 memory 274. In FIG. 2B, the L1 memory 282 may receive data from any of its adjacent Tiles and/or from L2 memory if it is an edge Tile. Similarly, it may transfer data to any of its adjacent Tiles and/or to L2 memory if it is an edge Tile. The data transfer operations are controlled by data transfer instructions received and executed by the Tiles.

Each Tile 280 also includes a compute pipeline 285 for executing computations using data stored in the L1 memory 282. The L1 memory acts as software-configurable registers for the compute pipeline 285. The compute pipeline 285 includes matrix multiplication circuitry 286, such as a systolic array, and circuitry for implementing different types of operators 287. The computations are controlled by compute instructions received and executed by the Tiles.

In this particular example, all of the data transfer instructions and compute instructions executed by the Tiles are statically scheduled. These instructions include data transfer between L1 memories in different Tiles, and data transfer between L1 memory and L2 memory. Data transfer instructions may specify one hop at a time (e.g., transfer data to the east neighbor Tile) or may specify destination and path through intermediate Tiles (e.g., transfer data to Tile (5,5) using path east-east-north-north-east). The instructions also include matrix multiplies performed by the Tiles and operators applied by the Tiles. These operations do not require very many different instructions to implement, so the overall instruction set may be fairly small, for example not more than 20 instructions, or not more than 50 instructions.

The L3 memory 290 is off-chip. In this example, the L1 and L2 memories are implemented as on-chip SRAM and the L3 memory is implemented as DRAM (flash memory and SSD drives are other alternatives). Because the L1 and L2 memories are implemented as SRAM, the data transfers between L1 memories or between L1 and L2 memories have deterministic timing, so these data transfer instructions can be statically scheduled by the compiler. However, data transfer from off-chip DRAM is more unpredictable in timing. As a result, these instructions are non-deterministic in nature and they are executed by the microcontroller 277. Therefore, they are executed in one of the non-deterministic phases and they are not statically scheduled.

In one approach, the instructions in the computer program and the data required for computation (e.g., input, weights, biases, parameters for operators) are initially loaded into L3 memory 280. From time to time, instructions and associated data are transferred from L3 memory into L1/L2 memory during a non-deterministic phase since the timing of data transfers from DRAM is not deterministic. Once these instructions and data are loaded into L1/L2 memory, the computer program enters a corresponding deterministic phase in which the Tiles execute the loaded instructions according to a static schedule. The non-deterministic and deterministic phases may occur concurrently. For example, data may be continuously streamed into the L1/L2 memory during the non-deterministic phase, with the corresponding statically scheduled instructions from the deterministic phase consuming that data. In one approach, the Tiles execute only statically scheduled instructions, and all non-statically scheduled instructions are executed by processing elements outside the Tile mesh, for example, the microcontroller 277.

SRAM has predictable timing so implementing the L1 and L2 memories as SRAM allows the compiler to statically schedule data transfers from those memories into the Tiles for computation. However, there is a limit to the amount of SRAM that may be implemented on a die. In order to increase the effective size of SRAM, a virtual SRAM approach may be used. In one approach, the compute instructions that consume certain data are not fetched into the Tiles until after the corresponding data have been transferred from DRAM (L3 memory) to SRAM (L1/L2 memory). This guarantees that the compute instructions will not be executed by the Tiles before the data is available. All data effectively will appear as if it is transferred to the Tiles from SRAM for computation, even if all of the data would not fit into the available SRAM.

L2 memory may also be used to temporarily store interim values that are too voluminous to store in L1 memory. For example, a layer K of the MLN may produce a large amount of data at its output, to be used as input to the next layer K+1. The layer K output may be stored in L2 memory and then retrieved from L2 memory as needed for the next layer's computations. This may be implemented using a ping pong buffer approach when multiple input samples are processed as a pipeline. The L2 memory is divided into two regions A and B. When a first input sample is processed, the layer K output is stored in region A of the L2 memory. The computations for layer K+1 retrieve the stored values from region A. At the same time, the second input sample is processed and the layer K output is stored in region B of the L2 memory. The two regions then alternate, with the Tiles implementing layer K storing to one region while the Tiles implementing layer K+1 read from the other region. The synchronization is implemented by the static scheduling. The compiler knows when regions AB will be ready and the instructions to implement layer K+1 will execute after that time. No synchronization primitives are needed.

Efficient operation of the MLN can be achieved by avoiding or reducing data transfers to and from L2 memory where possible and instead transferring some or all data between layers by directly streaming between the L1 memories. This is desirable because transfers between L1 memories are generally less time consuming and create less congestion than transfers to and from L2 or L3 memory. Furthermore, power consumption can be reduced by transferring data directly between source and destination L1 memories and avoiding intermediate writes to L2 or L3 memory because it reduces the overall number of read and write operations. However, L1 memory typically has limited capacity that is generally insufficient to handle the full set of intermediate outputs of a given layer of the MLN. To resolve this problem, the computations of the MLN may be intelligently ordered so that as incremental data is produced by each layer, it can be immediately used by a subsequent layer without waiting for all of the computations of the layer to be completed. Once an intermediate output has been processed by all computations of the subsequent layer that depend on it, that intermediate output can be released from memory, thus freeing up space for other computations. By intelligently ordering the computations, the MLN can be implemented using limited memory resources at any given time, which for at least some portions of the MLN, may avoid or minimize the number of transfers and/or the amount of data in each transfer to and from L2 or L3 memory.

FIGS. 3-7 provide specific examples of techniques for reducing memory usage and data transfer by intelligently ordering computations of an MLN. In FIG. 3A, an example MLN is illustrated in which a first layer 302 produces a 2×2 activation matrix A (i.e., outputs) and a second layer 304 combines the activation matrix A with a 2×2 set of weights W to generate a 2×2 output matrix B. That is, A is the output of layer 302 and input to layer 304, W are the weights of layer 304, and B is the output of layer 304 (ignoring any operators that may be applied). In a conventional implementation, the full 2×2 matrix A is first computed by layer 302 and four elements (a11, a12, a21, a22) are stored in memory. To implement layer 304, the matrix A and weights W are loaded from memory and combined to generate the output matrix B. While this approach is feasible for the extremely simplified example of FIG. 3A involving only 2×2 matrices, a practical application of an MLN can involve matrices millions or billions of times larger and could not be practically implemented without relying on large data transfers to and from L2 and L3 memory.

FIG. 3B illustrates the MLN of FIG. 3A in more specific detail to illustrate the dependencies between the layers 302, 304. In this example, layer 304 implements a 2×2 matrix multiplication of the activation matrix A and the weights matrix W that consists of four dot products. When applying this function, each element of the output matrix B is dependent on only a subset of the elements of the activation matrix A and a subset of the weights W. Specifically, the element b11 is dependent only on a11, a12, w11, and w21; the element b12 is dependent only on a11, a12, w12, w22; the element b21 is dependent only on a21, a22, w11, and 21; and the element b22 is dependent only on a21, a22, w12, and w22. Based on these dependencies, b11 and b12 can be computed after a11 and a12 are available independently of whether or not a21 or a22 are available. Similarly, b21 and b22 can be computed immediately after a21 and a22 are available independently of whether or not a11 or a12 are available. Thus, the MLN may be viewed as being composed of different partial networks that each independently compute one or more outputs based on only a subset of intermediate outputs of the MLN. Furthermore, the intermediate outputs associated with each of the partial networks need not be stored in memory at the same time if the partial networks are computed sequentially.

FIG. 3C illustrates a technique for ordering the computations of the MLN in a manner that takes advantage of the independent partial networks identified in FIG. 3B and reduces the overall memory usage relative to FIG. 3A. In a first time period 312, elements a11 and a12 are computed. These elements may be computed in parallel or serially in either order during the first time period. During a second time period 314, elements b11 and b12 are computed. Depending on the implementation, b11 and b12 may be computed in parallel or serially in either order. Once b11 and b12 are computed, a11 and a12 are no longer needed and can be released from memory. Then, a21 and a22 are computed in a third time period 316 (in parallel or serially in either order), and b21 and b22 are computed in a fourth time period 318 (in parallel or serially in either order). In alternative implementations, the order of processing the partial networks for b11, b12 and b21, b22 could be reversed. For example, the computations in time periods 316 and 318 may instead occur first, followed by the computations in time periods 312 and 314. In either case, only two elements of the activation matrix A from layer 302 are stored in memory at any given time. Thus, the technique cuts the memory usage in half relative to the technique of FIG. 3A.

Depending on the architecture of the MLN, it may be also be efficient to release weights from memory once they are no longer needed (e.g., in MLNs where the weights are not constant and subsequent data samples do not necessarily use the same weights). For example, if the computation in time period 318 does not depend on weights w11, w21, these weights could also be released from memory after time period 314.

When implemented in an MLA, the computations of FIG. 3C may be allocated to Tiles in various ways. In one example implementation, computations for different layers are generally allocated to different Tiles or groups of Tiles. Thus, for example, a first Tile or group of Tiles performs the computations of layer 302 to generate the matrix A and a second Tile or group of Tiles performs the computations of layer 304 to generate the matrix B. Here, for example, a first Tile may compute a11 and a12 during time period 312 and store it to its L1 memory. In the time period 314, the first Tile may directly stream the elements a11, a12 from its L1 memory to an L1 memory of a second Tile (without passing through L2 or L3 memory) that computes b11, b12. The first Tile may then compute a21 and a22, overwriting a11 and a12 (which are no longer needed) in its L1 memory. The first Tile may then stream a21 and a22 to the L1 memory of the second Tile, which computes b21, b22. In other example implementations, the elements a21, a22 do not necessarily overwrite a11, a12 but may be instead be stored to a different location in L1 memory, while the memory locations occupied by a11, a12 may be overwritten by different data elements from some other layer, data associated with a different input data sample, data associated with a different MLN, or data for some other purpose. In other example implementations, computations of a single layer may be divided between multiple Tiles. For example, the computation of a11 may be performed by one Tile and the computation of a12 may be performed by a different Tile. In other cases, multiple layers may be implemented by a single Tile or set of Tiles. For example, all of the computations of FIG. 3C could be performed serially by a single Tile.

The example of FIGS. 3A-3C is an extremely simplified example for illustrative purposes. In practice, the activation matrix A, weights matrix W, and output matrix X could each include millions or billions of elements. At these scales, the L1 memory capacity may be insufficient to store the entire activation matrix A at one time, and thus the technique of FIG. 3A could not practically be implemented without relying on transfers to and from L2 or L3 memory. Furthermore, although the example of FIGS. 3A-3C reduces the memory usage by half, a real MLN may include layers with much sparser dependencies. For example, if a given output is dependent on only 1% or less of the set of prior intermediate outputs, the memory usage at any given time can be similarly reduced. The technique in FIG. 3C thus may enable the memory usage to be significantly limited and enable an MLA to implement at least some portions of the transfers between layers of the MLN by streaming directly between L1 memories of Tiles without relying on transfers to and from L2 or L3 memory.

Figure 4A:
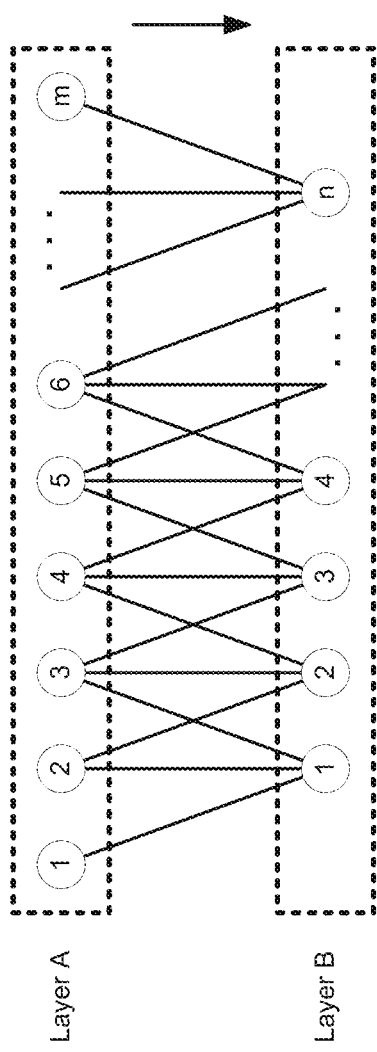
FIG. 4A-4B illustrate a second example of a technique for ordering computations in implementing a machine learning network.
Figure 4B:
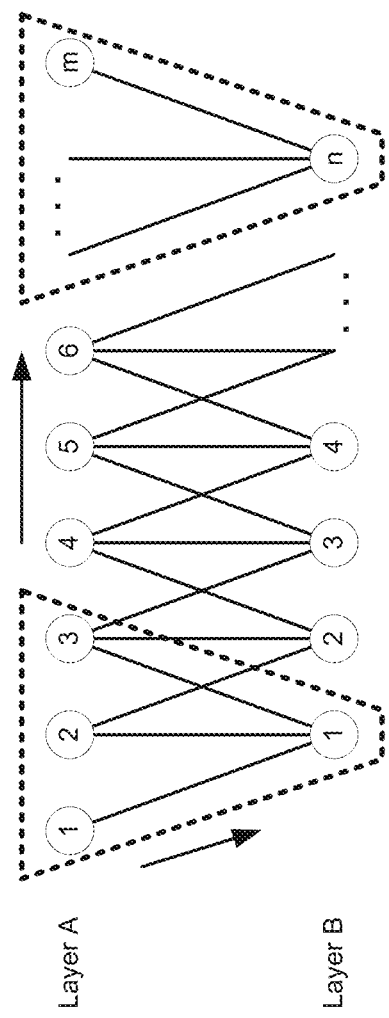

FIGS. 4A-4B illustrates another example of a machine learning network and a technique for reducing memory usage by intelligently ordering the computations of an MLN. In this example, layer A of the MLN produces M intermediate outputs A1, . . . , Am and layer B produces N outputs B1, . . . , Bn. In FIG. 4A, the MLN is computed using a conventional technique in which the results of layer A are first computed, and the results of layer B are then computed after the entire set of intermediate output A1, . . . , Am is produced. As described above, implementing this technique requires storage of M intermediate outputs, which can be in the millions or billions for a typical MLN and too large to implement without offloading data to L2 or L3 memory.

FIG. 4B illustrates a technique in which the computations are intelligently ordered to reduce the memory usage. Here, partial networks are identified for each output 1, . . . , n of layer B, where each partial network includes only the intermediate results on which an output is dependent. Thus, for example, a first partial network for output B1 may include the portions of the MLN that produces output B1 and intermediate outputs A1, A2, and A3; a second partial network for output B2 may include the portions of the MLN that produce output B2 and intermediate outputs A2, A3, and A4; and so on. In this example, the partial networks have overlapping intermediate outputs. For example, intermediate output A4 is part of the partial networks for producing B2, B3, and B4. The structure of the MLN in FIGS. 4A-4B is representative of a convolution function that is common in MLNs.

Each partial network may be executed independently. However, because some of the partial networks overlap, it is most efficient to order them in a manner that groups partial networks with overlapping intermediate outputs together in time, so that these intermediate outputs can be generated and quickly released from memory when no longer needed. Particularly, the MLN may be efficiently computed by first computing intermediate outputs A1, A2, and A3 followed by B1 during a first time frame. After the first time frame, A1 is no longer needed. In a second time frame, A4 is computed followed by B2 (A2 and A3 were already computed in the prior time frame). Here, A4 could directly overwrite A1 in memory in one implementation, or A4 could be stored to a different unoccupied memory location, and the memory location of A1 could be freed up for some other data. This process can repeat for the entire MLN. At each time period, only three intermediate outputs from layer A are necessarily stored in memory at any given time no matter how large the MLN. The set of intermediate outputs can be stored using a circular buffer, for example. As a benefit of this ordering, the relatively small number of intermediate outputs from Layer A can be directly streamed between L1 memories and large transfers of data between the Tiles and L2 or L3 memory can be avoided.

In other examples, the ordering of partial networks may be determined based on which partial networks utilize overlapping weights. For example, a group of partial networks that apply the same weights may be ordered consecutively such that the weights can be released from memory once they are no longer needed.

While the example of FIGS. 3A-3C and 4A-4B include only two layers, the same principles can be applied to an MLN with any number of layers. In a general process, a set of partial networks can be identified by starting at an output of the MLN and tracing the dependencies backwards through the layers of the MLN to the inputs. In other words, a reverse flow analysis is performed from the output through the intermediate outputs of each layer on which the output is dependent. This reverse flow analysis results in a set of partial ordering constraints for the computations within each partial network.

Figure 5:
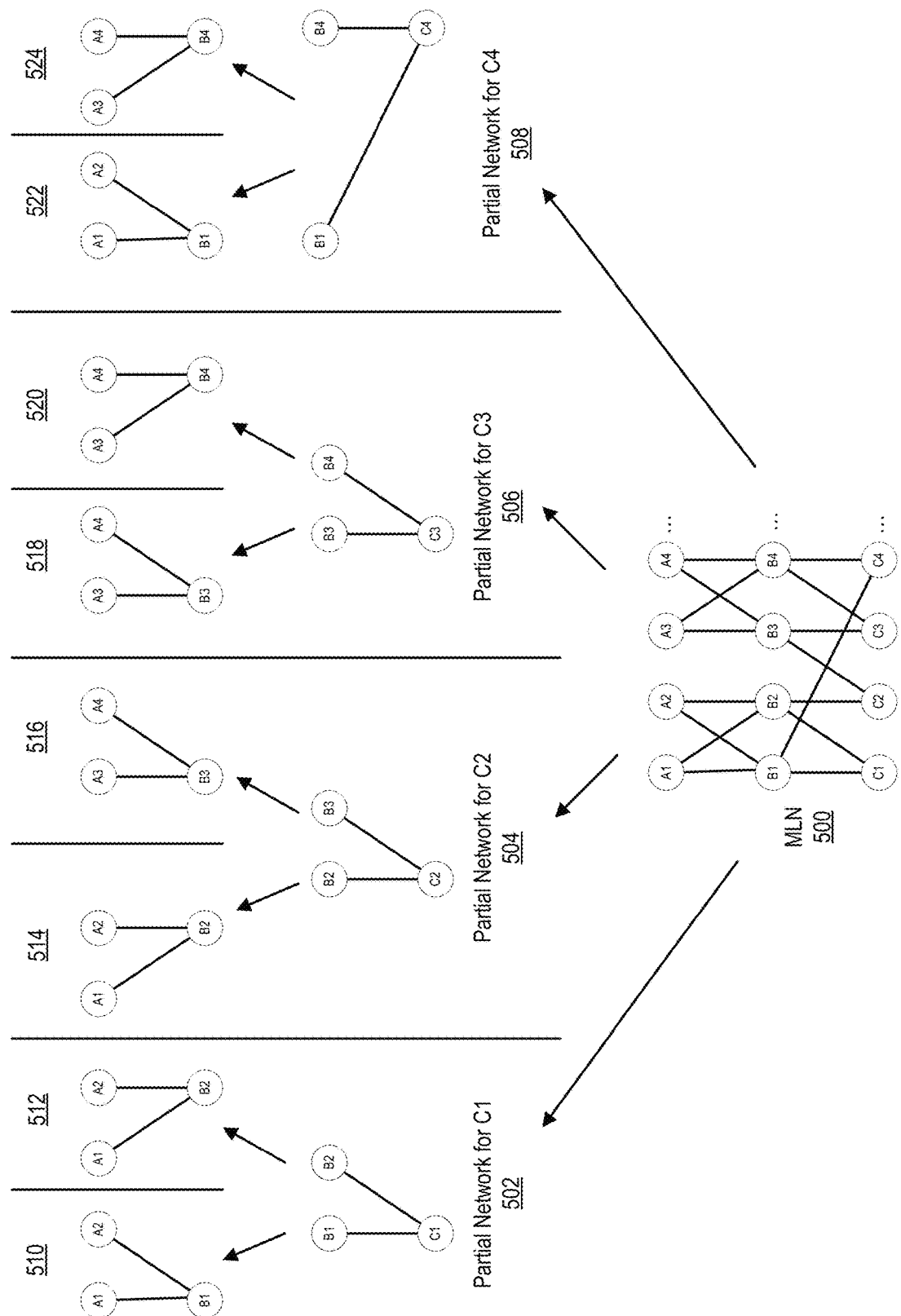
FIG. 5 illustrates third example of a technique for ordering computations in implementing a machine learning network.

FIG. 5 illustrates an example embodiment of a reverse flow analysis technique for determining a set of partial ordering constraints for computations of an MLN 500. The MLN 500 is illustrated as having three layers A, B, and C but the described techniques can be applied to MLNs with any number of layers. In FIG. 5, partial networks 502, 504, 506, 508 can be determined for each of the outputs of layer C that each represent their respective sets of dependencies. The partial networks 502, 504, 506, 508 each in turn are inclusive of partial networks for computing the intermediate outputs of layer B (e.g., partial networks 510, 512, 514, 516, 5108, 520, 522, 524). If the MLN 500 has more than 3 layers, additional nested partial networks can be identified for each output and intermediate output.

The partial networks can overlap. For example, the computations in 512 and 514 which form parts of partial networks 502, 504 respectively are identical. Thus, these computations do not necessarily need to be performed twice and the same result can be used in both partial networks 502, 504.

The partial networks 502-508 can be processed independently of each other to arrive at their respective outputs. Similarly, nested partial networks for computing intermediate outputs can be performed independently of each other (e.g., the computations in 510 and 512). The partial networks may be ordered in an optimized way based on various factors. For example, by identifying partial networks with overlapping intermediate outputs (as in the example of FIG. 4B), the partial networks can be ordered to minimize the time that the intermediate outputs are stored in memory. For example, in FIG. 5, the computations may be ordered as A1, A2, B1, B2, C1, A3, A4, B3, C2, B4, C3, C4. In this technique, A1 and A2 may be removed from memory once B1 and B2 are computed. A3 and A4 may be removed from memory after B3 and B4 are computed. Furthermore, B2 may be removed from memory after C2 is computed, B3 may be removed from memory after C3 is computed, and B1 and B4 may be removed from memory after C4 is computed.

In other embodiments, the partial networks do not necessarily traverse all the way from the inputs to the outputs. For example, a set of partial networks may be limited to different portions of the MLN between the first layer and some intermediate layer, and another set of partial networks may be limited to the portions of the MLN between the intermediate layer and the last layer. The partial networks above the intermediate layer may be ordered according to optimization criteria for processing during a first time period, and the partial networks below the intermediate layer may be ordered for processing during a second time period.

Figure 6:
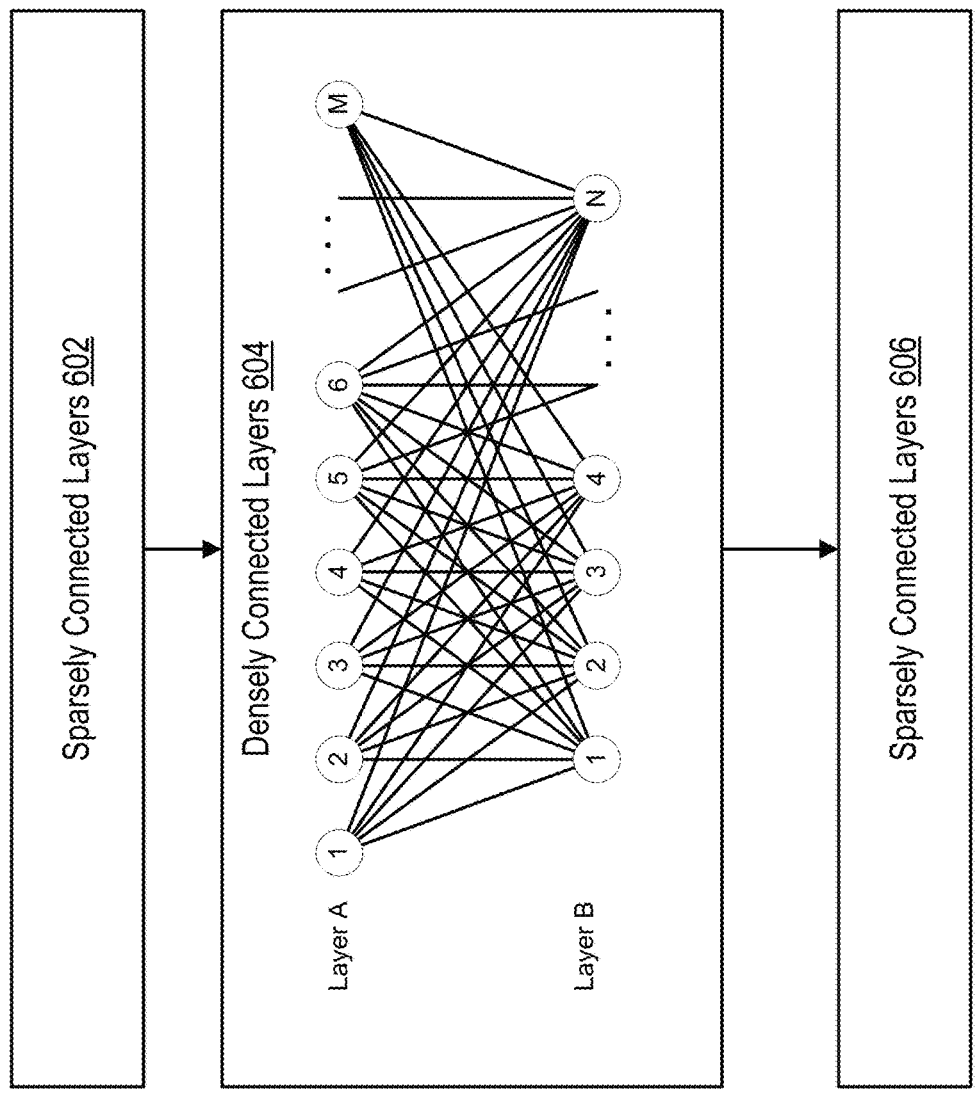
FIG. 6 illustrates fourth example of a technique for ordering computations in implementing a machine learning network.

The above described technique is possible when layers of an MLN are relatively sparsely connected such that a given output or intermediate output is not dependent on a very large number of intermediate outputs from the previous layer. However, in some MLNs, layers may be much more densely connected. In the example of FIG. 6, an MLN includes a pair of layers A and B that have very high interdependencies because some or all of the computations of layer B are dependent on a large number of computations of layer A. In this example, partial networks that span the layers all the way from the output to the input will each include a very large number of intermediate outputs between layer A and layer B. In this case, instead of determining partial networks that span the full range of layers, the compiler 120 may instead split the MLN into groups of layers to isolate the densely connected layers from the sparsely connected layers. For example, in FIG. 6, the layers are divided into a first group of sparsely connected layers 602, a pair of densely connected layers 604, and a second group of sparsely connected layers 606. The above described techniques can be applied separately to the group of sparsely connected layers 602 and the group of sparsely connected layers 606 to identify and order processing of partial networks contained within each group 602, 606. Thus, within each group 602, 606, the computations can be ordered in a manner that minimizes memory usage and enables intermediate outputs to be directly streamed between L1 memories of Tiles. The group 604 of densely connected layers may be separately implemented in a different manner. For example, once the sparsely connected layers 402 are processed using the techniques described above, the computations of layers A and B may be performed utilizing data transfers through L2 and/or L3 memories. In an embodiment, this may be implemented using the ping pong buffering scheme described above. Then once the layer B outputs are available, the group of sparsely connected layers 606 may be implemented similarly to the sparsely connected layer 602.

Figure 7:
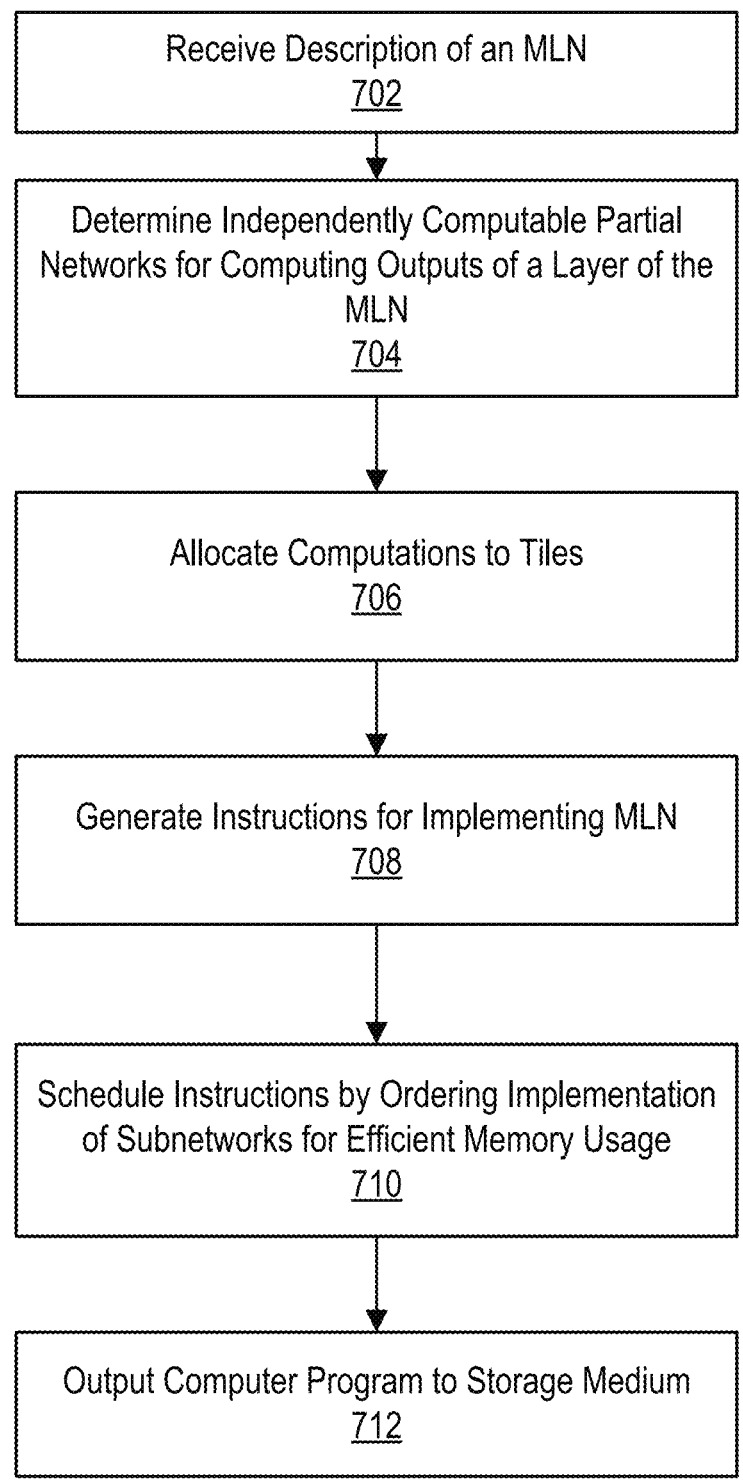
FIG. 7 is a flowchart illustrating an embodiment of a process for ordering computations of a machine learning network for efficient memory usage.

FIG. 7 is a flowchart illustrating an example embodiment of a process for intelligently ordering computations of an MLN in a manner that limits memory usage. A compiler 120 receives 702 a description of an MLN. The compiler determines 704 a set of partial networks from the MLN that are independently computable. The partial networks may span multiple layers and each include portions of the layers representing the computations and intermediate outputs on which a particular output of a layer is dependent. Different partial networks may include (but do not necessarily include) overlapping computations and intermediate results. Generally, different partial networks have at least one non-overlapping dependency on intermediate results. For example, the compiler 120 may determine for a first output of a layer of the MLN, a first partial network comprising portions of one or more prior layers that produce a first set of intermediate outputs on which the first computation is dependent; may determine for a second output of the layer of the MLN, a second partial network comprising portions of one or more prior layers that produce a second set of intermediate outputs on which the second output is dependent; and so on.

The compiler 120 allocates 706 the computations of the MLN to Tiles. In an example implementation, different layers of the MLN may be assigned to different Tiles or groups of Tiles. Alternatively, two or more layers may be assigned for implementation in whole or in part by a single Tile or group of Tiles.

The compiler 120 generates 708 Tile instructions for implementing the MLN. The Tile instructions may include computation instructions for performing the computations of the MLN and may include data transfer instructions for performing transfers of data used by the computation instructions.

The compiler 120 schedules 710 the instructions by ordering implementation of the partial networks in a manner that provides efficient usage of memory. For each layer in the partial network, the compiler may schedule instructions for obtaining a first set of intermediate outputs of a prior layer from memory and performing a first computation on the first set of intermediate outputs to generate a first output of a layer. This process may repeat for other output of the layer, and then may proceed similarly for remaining layer of the partial network. Once a partial network is completed, the compiler 120 may then proceed similarly with the next partial network. Additionally, once an intermediate output of a partial network is no longer needed (i.e., when all computations dependent on the intermediate have been performed) an instruction for overwriting that intermediate output may be scheduled. The overwriting instruction may be part of the implementation of the next partial network. For example, an intermediate output from a particular layer of one partial network may be overwritten by an intermediate output from the particular layer for the next partial network. Alternatively, the overwriting instruction may involve some other data that is part of a different layer, a different MLN, a different data sample, or some other data value. However, at any given time, only a limited subset of intermediate values associated with a given layer are stored (for at least some of the layers), and these values may be streamed directly between L1 memories of Tiles without being transferred to or from L2 or L3 memory.

The compiler 120 then outputs 712 the computer program for implementation on the MLA. For example, the compiler may write the computer program to a non-volatile memory device from which the computer program can be loaded by a controller associated with the MLA at run-time.

Figure 8:
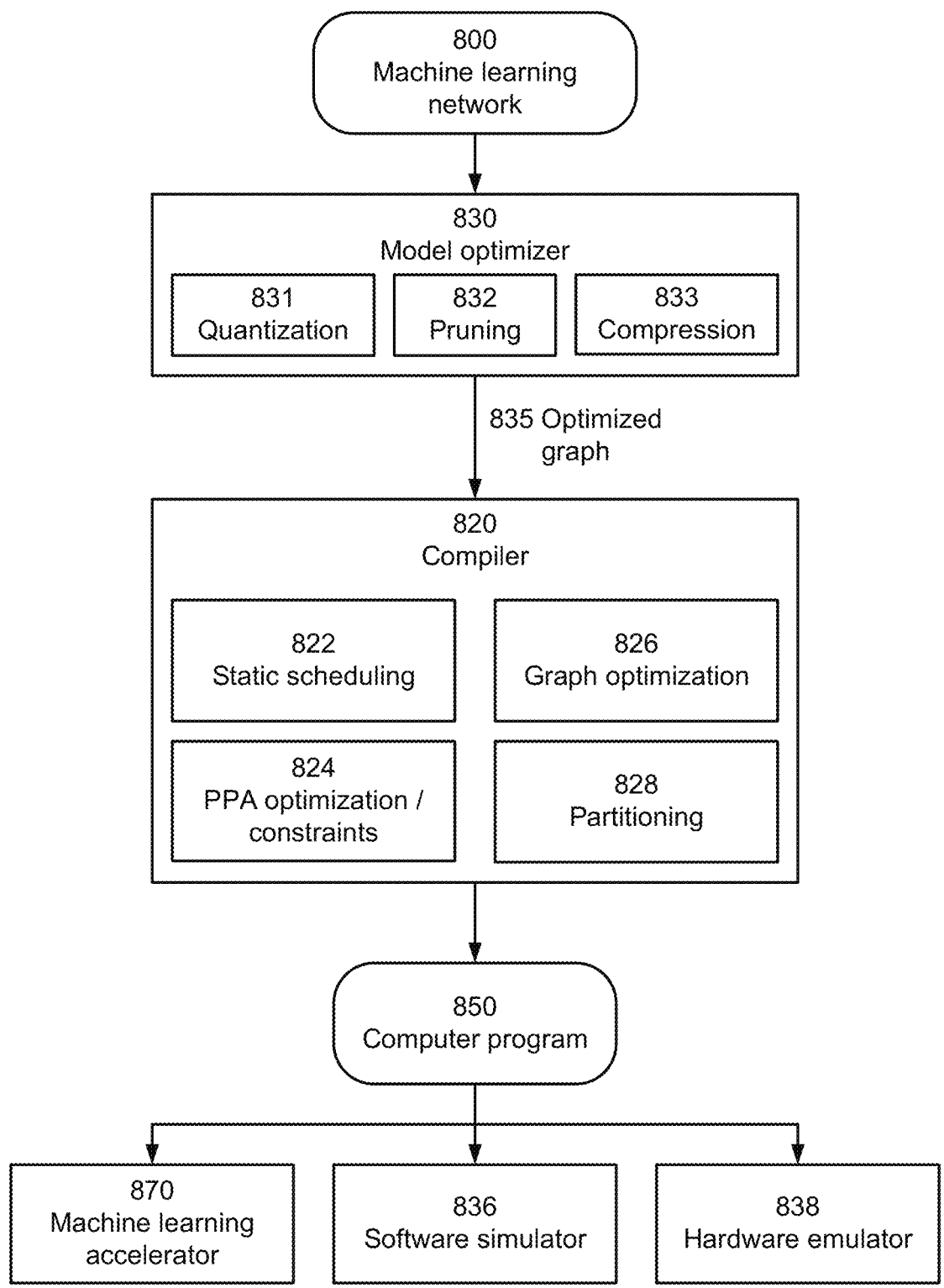
FIG. 8 is a block diagram of a software development environment, including an ML compiler.

FIG. 8 is a block diagram of a software development environment including an ML compiler 820. In this example, the software development environment also includes a model optimizer 830. The model optimizer 830 receives a description of the MLN 800 and produces an optimized graph 835 of the MLN. It may apply optimizations such as quantization 831, pruning 832 and/or compression 833. Quantization 831 reduces the resolution of calculated values. For example, floating point values may be quantized to a certain number of bits and then integer math used instead of floating point math. This reduces the complexity and power consumed by the Tiles. Pruning 832 removes parts of the MLN that do not contribute significantly to the overall results. For example, if certain weights are zero or close to zero, those weighted interconnects may be pruned. Finally, because MLNs contain a large amount of data, compression may be used successfully to reduce data transfer bandwidths.

The resulting optimized description 835 of the MLN may be expressed as a graph, in which the nodes of the graph represent nodes in the MLN and the edges of the graph represent the weighted interconnects. The compiler 820 receives the optimized graph 835 and produces the resulting computer program 850. The compiler 820 may perform operations including static scheduling 822, PPA (power performance area) optimizations 824, graph optimizations 826 and/or partitioning 828. Static scheduling 822 of the appropriate instructions was described above.

PPA optimization 824 includes different optimizations of the computer program 850. For example, the allocation of MLN computations to Tiles may be optimized to reduce power consumption, to increase performance (such as reducing latency or increasing throughput) and/or to reduce area (e.g., number of Tiles used).

For a given graph representation of an MLN, the number of computations required to execute the MLN is fixed. As a result, in one approach, the compiler may optimize to increase the utilization of compute resources in the Tiles—to keep the compute pipelines as busy as possible. However, for a Tile to execute a computation, the data for that computation must be available. This means that any prior computations must be completed and that those results must be transferred to the Tile doing the next computation. Thus, rather than focusing on computations, the compiler may optimize with respect to data transfer to reduce the wait times of computations. It may also allocate computations to Tiles in order to reduce data transfers between Tiles in the same mesh, to reduce data transfers from outside the MLA and/or to reduce data transfers that cross the boundary of the mesh (e.g., reducing data transfers between L1 and L2 memory and trying to keep all data in L1 memory).

The compiler 820 may also optimize 824 the computer program 850, subject to constraints on power, performance, area and/or any of the quantities described above. Graph optimization 826 includes analysis of the graph representing the MLN to prune, merge or quantize links, parameters, values, and layers to achieve better performance. Partitioning 828 concerns mapping the computations in the MLN to an implementation on the MLA. This includes determining which computations are allocated to which Tiles and how data flows through the mesh of Tiles during computation. If there are multiple mosaics, it also includes determining which computations are allocated to which mosaics.

The resulting computer program 850 may be loaded into memory for execution on a machine learning accelerator 870. For example, one possible application is object detection. In this case, the inputs are images captured by a video camera. The MLN 800 has been trained to identify certain objects in the video images. The computer program 850 implementing the MLN is loaded onto memory that is accessible by the MLA 870, which is implemented as a chip inside the camera. This way, images captured by the video camera may be immediately analyzed by the computer program 850 running on the MLA 870.

In addition to the MLA 870, the computer program 850 or parts of it may be run on a software simulator 836 and/or hardware emulator 838 (including FPGAs configured as MLAs). These may be used for product development, debugging and/or prototyping. For some purposes, a full simulation or emulation is not necessary. For example, to check that there are no collisions or conflicts between statically scheduled instructions, only the flow of data may be simulated or emulated. It is not necessary to compute actual values.

Components of the software development environment of FIG. 8 including the model optimizer 830, compiler 820, computer program 850, and software simulator 836 may each be implemented as instructions stored to a non-transitory computer-readable storage medium. The instructions may be executed by one or more processors to perform the functions attributed to the components as described herein.

Figure 9:
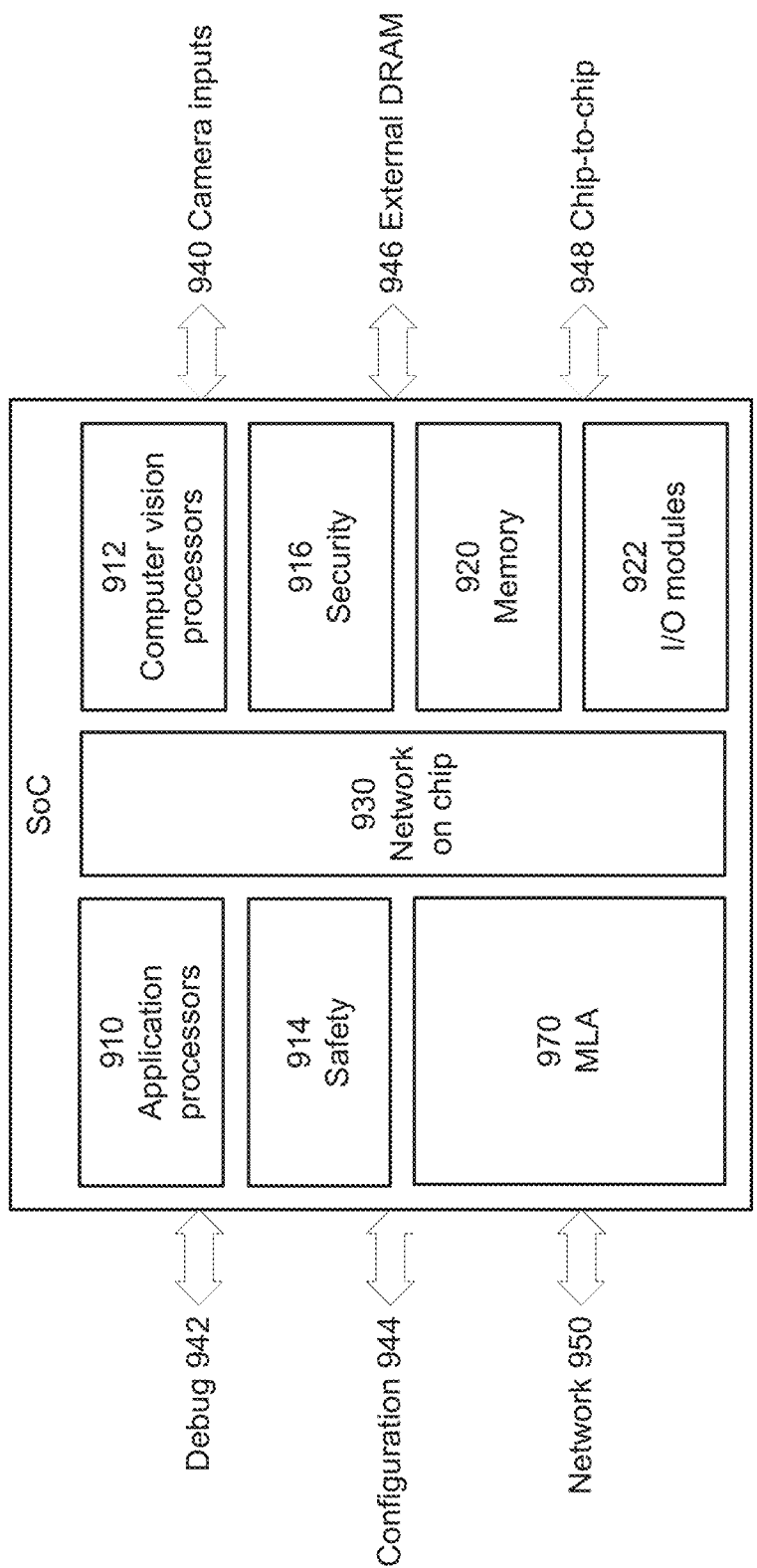
FIG. 9 is a block diagram of an integrated circuit product that includes an MLA.

FIG. 9 is a block diagram of an integrated circuit that includes an MLA 970. In other words, other components may be included on the same die as the MLA. This example includes the following additional blocks: application processor 910 (e.g., general purpose CPU running applications), computer vision processor 912 (or other types of application-specific processors), safety 914, security 916, additional SRAM (memory) 920 and input/output circuitry 922. It also includes a network 930 for communication between the different components. This type of semiconductor chip may be referred to as a system-on-chip (SoC).

The connections to the external world include camera inputs 940 for the computer vision processors, ports for debug 942 and configuration 944, a connection 946 to external memory (e.g., DRAM), chip-to-chip connections 948, and network connections 950 (e.g., Ethernet and PCIe).

The SoC of FIG. 9 may be combined with other components to perform various tasks in edge devices. Example applications for edge devices include automotive and other forms of transportation including autonomous transportation, agricultural, industrial, robotics, drones, surveillance and security, smart environments including smart cities, medical and personalized health. Example tasks include computer vision, image analysis, image understanding, speech recognition, audio analysis, audio understanding, natural language processing, classification and pattern recognition tasks. For edge devices, it may be desirable to perform certain tasks in real-time.

In addition to memory and other programmable processors, an edge device may also include sensors, such as cameras (both still image and video cameras), microphones, temperature sensors, pressure sensors and other types of sensors. The sensors may capture samples that are used as inputs to a computing pipeline within the edge device. For example, image samples may be input to the computer vision processors 912, which perform initial operations such as edge detection and enhancement, contrast enhancement, motion detection, and optical flow. Raw and/or processed images may be then input to the MLA 970 for analysis by the machine learning network. The MLA may also receive other inputs, such as metadata from other sources and data from other sensors. The application processors 910 may also perform various functions in the overall pipeline and may also serve as a master controller that coordinates operation of the MLA and the other programmable processors in the pipeline.

Edge devices may be portable with less power available for computations compared to, for example, cloud-based server farms. It may also be desirable for the computing pipeline within the edge device to perform tasks without utilizing cloud-based or other remote compute resources. In some implementations, the MLA implements computations in the machine learning network at a performance of at least 50 TOPs (50 trillion operations per second) at a power consumption of not more than 5 watts. The performance may be increased by increasing the number of Tiles in the mesh or the number of Tile meshes on the die.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A method for generating a computer program to implement a machine learning network on a machine learning accelerator (MLA), the MLA comprising one or more meshes of interconnected processing elements implemented on a semiconductor die, the method comprising:
    receiving a description of the machine learning network, the machine learning network comprising a plurality of interconnected layers;
    determining for each of a plurality of outputs of a layer of the machine learning network, respective corresponding partial networks that each include a respective set of intermediate outputs from prior layers on which computation of the output is dependent;
    allocating computations of the machine learning network to the processing elements;
    generating a set of instructions that implement the machine learning network on the processing elements;
    scheduling an order of execution of the instructions to implement the respective partial networks, where the scheduling comprises:
        scheduling computation of at least a first output of a first partial network based on first intermediate outputs of the first partial network;
        scheduling, following computation of the first output, removal of at least one of the first intermediate outputs of the first partial network from memory; and
        scheduling, following computation of the first output, computation of second intermediate outputs of the second partial network; and
    outputting the computer program.

2. The method of claim 1, wherein scheduling the execution of the instructions comprises:
    determining the order based on an overlap between the intermediate outputs of the respective partial networks.

3. The method of claim 1, wherein scheduling the execution of the instructions comprises:
    overwriting at least one of the first intermediate outputs with at least one of the second intermediate outputs of the second partial network.

4. The method of claim 1, further comprising:
    identifying a non-overlapping intermediate output in the first partial network that is absent from the second partial network; and
    scheduling the execution of the instructions such that at least one of the second intermediate outputs of the second partial network overwrites the non-overlapping intermediate output in the memory.

5. The method of claim 1, wherein at least one of the first intermediate outputs of the first partial network overlaps with at least one of the second intermediate outputs of the second partial network.

6. The method of claim 1, where scheduling execution the instructions comprises:
    determining a subset of the partial networks that have overlapping intermediate outputs; and
    scheduling to implement the subset of partial networks having the overlapping intermediate outputs consecutively.

7. The method of claim 1, further comprising:
    identifying a pair of densely connected layers;
    identifying a group of sparsely connected layers;
    deriving the partial networks as being contained with the group of sparsely connected layers.

8. The method of claim 7, wherein scheduling execution of the instructions comprises:
    scheduling computations by first set of processing units to implement a first layer of the pair of densely connected layers to generate a set of intermediate outputs;
    scheduling transfer of the set of intermediate outputs to L2 memory outside the processing units;
    scheduling transfer of the set of intermediate outputs from L2 memory to a second set of processing units; and
    scheduling computations by the second set of processing units to implement a second layer of the pair of densely connected layers.

9. The method of claim 1, wherein scheduling the execution of the instructions comprises:
    determining one or more deterministic phases; and
    statically scheduling the instructions to sequentially implement the partial networks during the one or more deterministic phases.

10. The method of claim 9, wherein statically scheduling the instructions includes:
    statically scheduling computation instructions of the processing elements; and
    statically scheduling data transfer instruction to move data into and output of L1 memories of the processing elements.

11. The method of claim 1, wherein scheduling the execution of the instructions comprises determining the order to minimize a total number of data transfers.

12. The method of claim 1, wherein scheduling the execution of the instructions comprises determining the order to minimize a number of data transfers to L2 memory external to the processing elements.

13. The method of claim 1, wherein allocating the computations of the machine learning network to the processing elements comprises allocating computations of a consecutive layers of the machine learning network to physically adjacent groups of processing elements.

14. The method of claim 1, wherein scheduling the execution of the instructions comprises:
scheduling computation of the first intermediate outputs on a first set of one or more processing elements and storing the first intermediate outputs to one or more L1 memories of the first set of one or more processing elements;
scheduling a transfer of the first intermediate outputs from the one or more L1 memories of the first set of one or more processing elements directly to one or more L1 memory of a second set of one or more processing elements; and
scheduling computation of the first output from the first intermediate outputs on the second set of one or more processing elements.

15. The method of claim 14, wherein scheduling the execution of the instructions further comprises:
scheduling computation of the second intermediate outputs on the first set of one or more processing elements and storing the second intermediate outputs in L1 memory of the first set of one or more processing elements;
scheduling a transfer of the second intermediate outputs from the one or more L1 memories of the first set of one or more processing elements directly to the one or more L1 memory of the second set of one or more processing elements; and
scheduling computation of a second output of the second partial network on the second set of one or more processing elements.

16. The method of claim 1, wherein scheduling the execution of the instructions further comprises:
scheduling computation of the first intermediate outputs on a first processing element and storing the first intermediate outputs to a first memory location of an L1 memory of the first processing element; and
scheduling computation of the first output from the first intermediate outputs on the first processing element.

17. The method of claim 16, wherein scheduling the execution of the instruction further comprises:
scheduling computation of the second intermediate outputs on the first processing element and storing the second intermediate outputs to the first memory location of the L1 memory of the first processing element; and
scheduling computation of a second output from the second intermediate outputs on the first processing element.

18. The method of claim 1, wherein determining the respective corresponding partial networks comprises:
performing a reverse flow analysis from the output through each layer of intermediate outputs on which the output is dependent to identify a set of partial ordering constraints for computations within the partial network.

19. A method for generating a computer program to implement a machine learning network on a machine learning accelerator (MLA), the MLA comprising one or more meshes of interconnected processing elements implemented on a semiconductor die, the method comprising:
receiving a description of the machine learning network, the machine learning network comprising a plurality of interconnected layers;
determining for each of a plurality of outputs of a layer of the machine learning network, respective corresponding partial networks that each compute one of the outputs and a set of intermediate outputs from prior layers on which the output is dependent;
determining an order to implement the respective partial networks based on an overlap between the partial networks;
allocating computations of the machine learning network to the processing elements;
generating a set of instructions that implement the machine learning network on the processing elements;
scheduling execution of the instructions to implement the respective partial networks according to the determined order; and
outputting the computer program.

20. The method of claim 19, where determining the order comprises:
determining a subset of the partial networks that have overlapping intermediate outputs; and
determining the order to implement the partial networks having the overlapping intermediate outputs consecutively.

21. The method of claim 19, wherein scheduling the execution of the instructions comprises:
computing intermediate outputs of a layer of a partial network on a first set of processing elements;
transferring the intermediate outputs directly to an L1 memory of a second set of processing elements; and
computing an output corresponding to the partial network on the second set of processing elements.

22. A system comprising a machine learning accelerator (MLA) implemented on a semiconductor die, the MLA comprising:
an on-chip memory system configured to store data used in computations for implementing a machine learning network; and
a mesh of interconnected processing elements coupled to the on-chip memory system, the processing elements including integrated L1 memory, the processing elements configured to execute instructions of a computer program to implement the machine learning network by sequentially implementing a set of partial networks corresponding to respective outputs of a layer of the machine learning network, each of the partial networks including computations for producing the output of the layer and a set of intermediate outputs from one or more prior layer on which the output is dependent, the instructions when executed causing the processing elements to:
for a first partial network of the machine learning network, obtaining a first set of intermediate outputs from a memory and perform a first computation on the first set of intermediate outputs of the first partial network to generate the first output; and
following completion of the first computation, computing, for a second partial network of the machine learning network, at least one of the second set of intermediate outputs of the second partial network and removing at least one of the first set of intermediate outputs from the memory.

23. The system of claim 22, wherein the instructions further cause the mesh of interconnected processing elements to implement partial networks of the machine learning network according to an order in which partial networks having overlapping intermediate outputs are implemented consecutively.

* * * * *